Aug. 10, 1965   E. LONG   3,200,044
CHARGING SYSTEM FOR NUCLEAR REACTOR
Filed Jan. 29, 1962   5 Sheets-Sheet 1

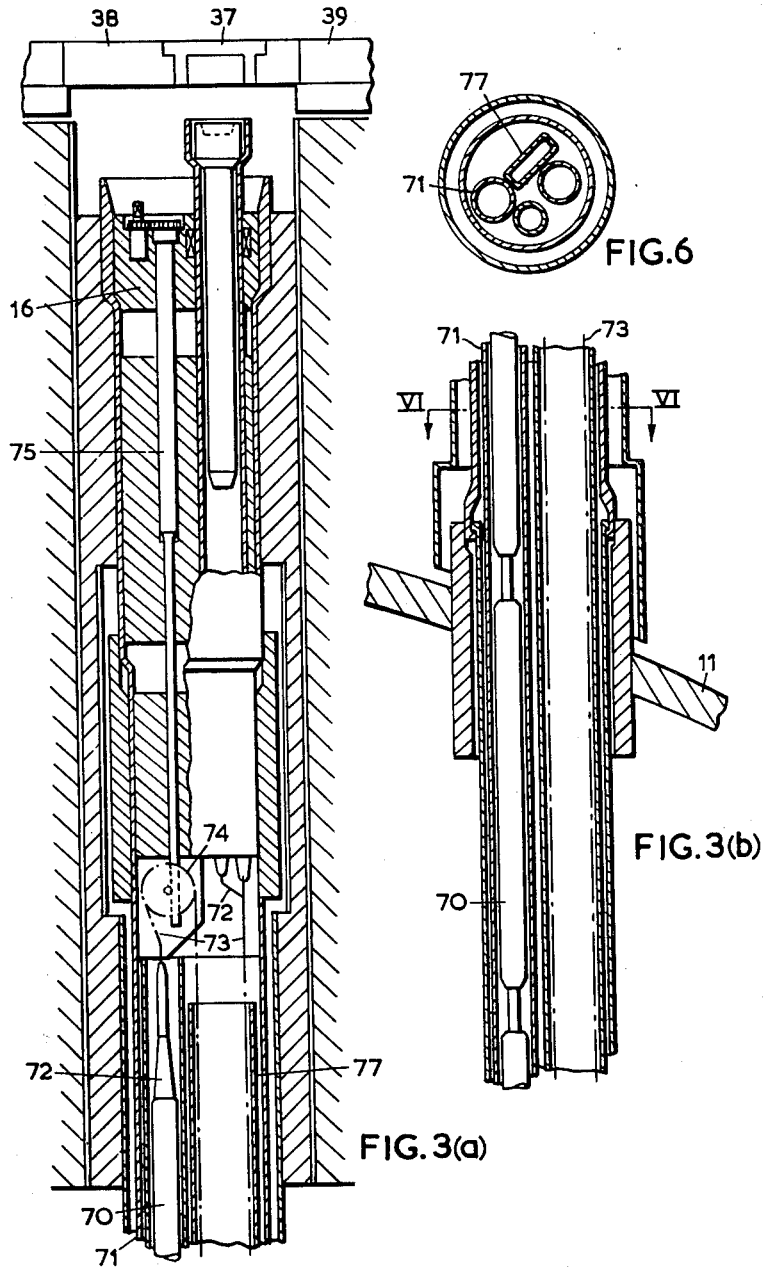

United States Patent Office 3,200,044
Patented Aug. 10, 1965

3,200,044
CHARGING SYSTEM FOR NUCLEAR REACTOR
Everett Long, Whetstone, England, assignor to The English Electric Company Limited, London, England, a British company
Filed Jan. 29, 1962, Ser. No. 169,401
Claims priority, application Great Britain, Feb. 1, 1961, 3,793/61
8 Claims. (Cl. 176—30)

This invention relates to apparatus for providing access to a group of fuel element channels through an access duct in the biological shield of a nuclear reactor.

According to the invention the apparatus includes, in combination, a rotatable charge chute adapted to be mounted within the duct with its axis displaced sideways by a substantial amount relative to the cross-sectional dimensions of the duct, the charge chute having an opening at the inner end thereof displaced radially from the axis of the charge chute by substantially the maximum amount allowable which will still permit withdrawal of the charge chute from the access duct, and an assembly of fixed fuel element guide tubes positioned adjacent the servicing ends of the fuel channels, each guide tube being aligned at one end with one of the fuel channels within the group and the other end being positioned so that access may be obtained to any desired fuel element channel within the group through the opening in the charge chute and the appropriate guide tube by simple rotation of the charge chute.

According to a preferred feature of the invention said other ends of the guide tube are positioned on a common pitch circle having its centre in alignment with the axis of rotation of the charge chute.

According to a further preferred feature of the invention, other apparatus is accommodated in the access duct such as for example a gas sampling selector valve or hoist mechanism for varying the position of a reactivity control member relative to the active part of the reactor.

According to another feature of the invention, apparatus for providing access to a group of fuel element channels in a nuclear reactor through an access duct in the biological shield includes, in combination, a rotatable charge chute adapted to be mounted in the duct and carrying a guide member movable angularly with respect to the axis of the charge chute, and an assembly of fixed fuel element guide tubes positioned adjacent the servicing ends of the fuel channels, each guide tube being aligned at one end with one of the fuel channels within the group and the other ends being positioned on a plurality of radii struck from a point in alignment with the axis of the charge chute, the arrangement being such that by appropriate rotational movement of the charge chute and/or appropriate angular movement of the movable guide member access may be obtained through the appropriate fixed guide tube to any particular fuel element channel within the group.

Charging apparatus for a nuclear reactor in various forms according to the present invention will now be described by way of example and with reference to the accompanying drawings, of which:

FIG. 1, which is split by convenience into three parts designated FIGS. 1(a), 1(b) and 1(c), is a sectional elevation of the apparatus;

FIG. 2, which is split into FIGS. 2(a), 2(b) and 2(c), is a sectional elevation of the apparatus in another form;

FIG. 3, split into FIGS. 3(a), 3(b) and 3(c), is a sectional elevation of the apparatus in yet another form;

FIG. 6 is a sectional plan on the line 6—6 of FIG. 3(b);

Figure 1A:
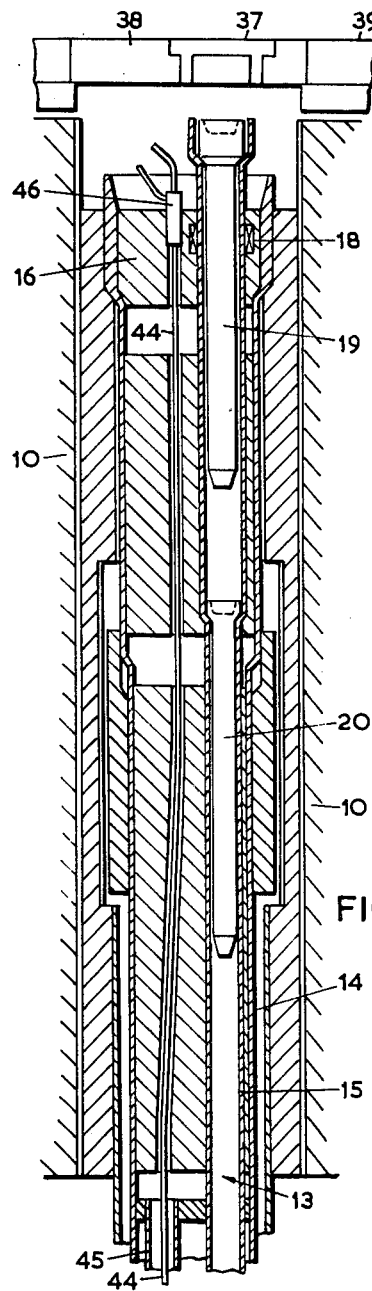
Figure 5:
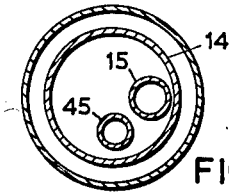
FIG. 5 is a sectional plan on the line 5—5 of FIG. 1(b)
Figure 1B:
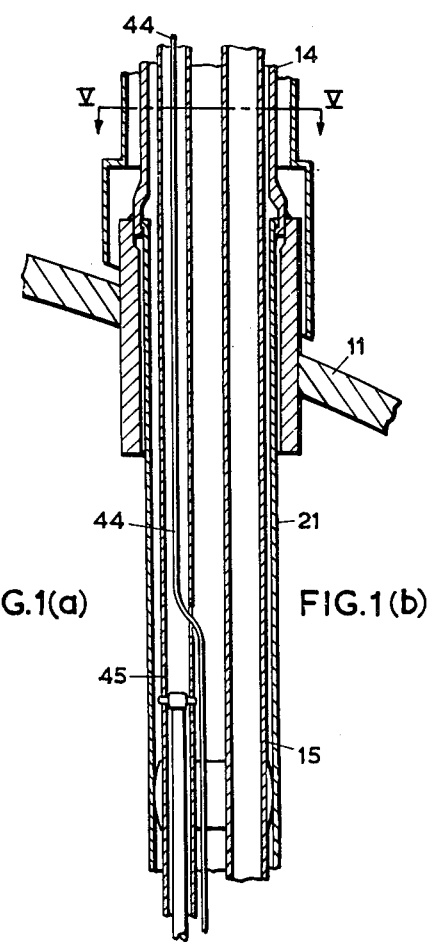
Figure 1C:
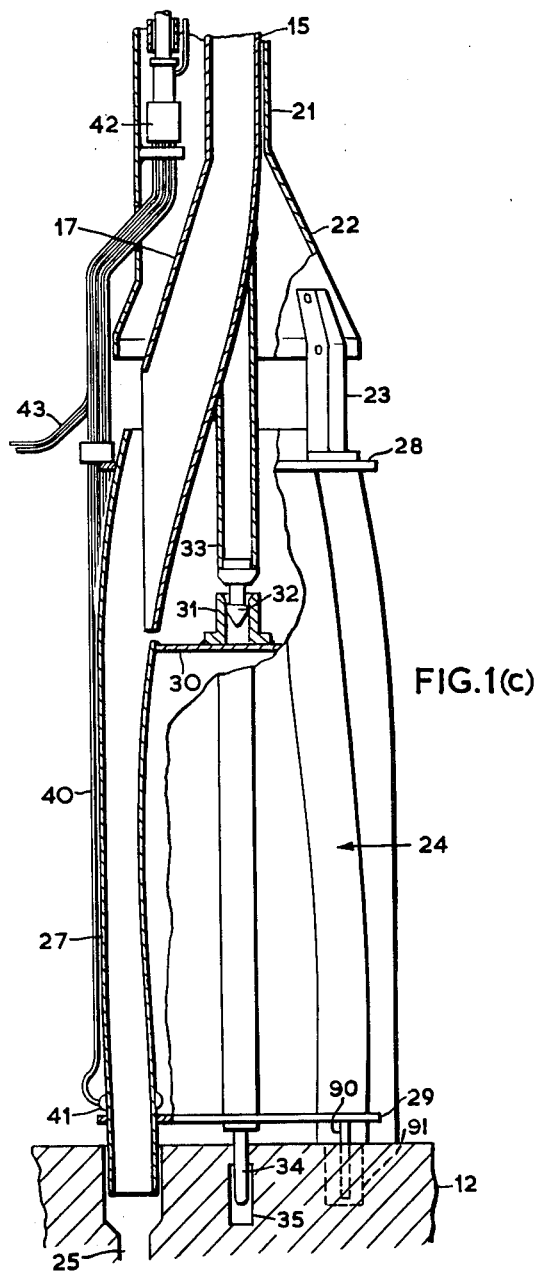

Referring now to FIGS. 1a, 1b, 1c and 5, the biological shield of the reactor is indicated at 10, the pressure vessel at 11, the core at 12, and a charge chute assembly at 13.

The assembly include a standpipe 14 and a charge chute 15 which passes upwards through a removable shield plug assembly 16 and which is bent radially outwards at its lower end as indicated at 17.

The charge chute is supported from a thrust race 18 carried by the shield plug assembly and its upper end is slotted so that when engaged by a fuelling machine drive tube it can be rotated to either side of a limit stop, not shown. The charge chute is normally sealed by an upper shield plug closure and shielded by the upper and lower shield plugs 19 and 20 respectively.

A standpipe extension tube 21 is flared outwards as shown at 22 and supports through brackets 23 a guide tube assembly generally indicated at 24.

This assembly ensures that all components lowered into the reactor core are guided into the appropriate channel. In the present example the lattice comprises sixteen fuel element channels 25 arranged in a square pattern of four by four, one channel (not shown) for samples and flattening sources, etc., and one channel for a control rod.

The guide tube assembly comprises eighteen tubes 27 which are held together by upper and lower transverse plates 28 and 29 respectively. The lower plate 29 maintains the lower ends of the tubes on a square pattern to match the pattern of the fuel channels in the core, whilst the upper plate 28 brings the tubes together so that their upper ends lie on a common pitch circle. On this same pitch circle lies the centre of a tube (not shown) leading to the channel which is used for samples and flattening sources, etc.

In the centre of an intermediate transverse plate 30 is a locating bush 31 which is engaged by a spigot 32 carried by a tube 33 depending downwards from the charge chute 15 on the axial centre line thereof. This ensures alignment of the charge chute with respect to the pitch circle of the tubes 27 under all conditions of misalignment which may arise. The recess in the standpipe wall allows a limited misalignment of the charge chute within the standpipe.

Figure 2A:
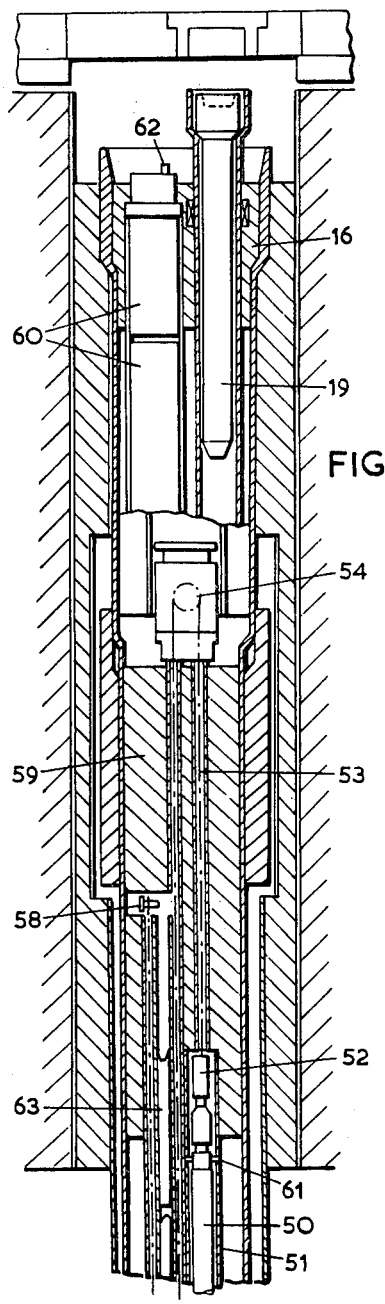
Figure 2B:
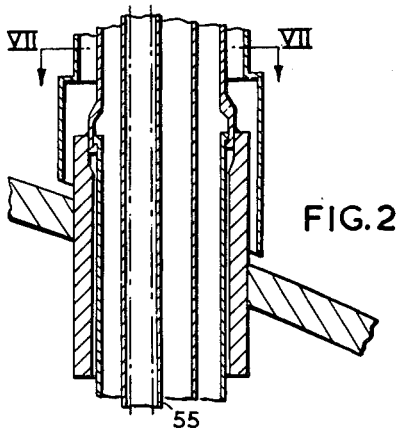
Figure 7:
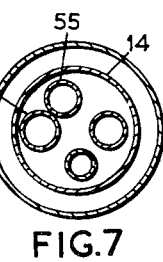
FIG. 7 is a sectional plan on the line 7—7 of FIG. 2(b)
Figure 2C:
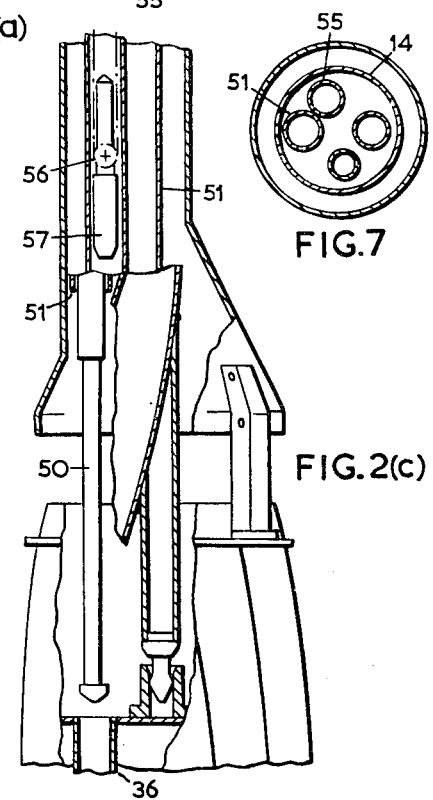
Figure 3C:
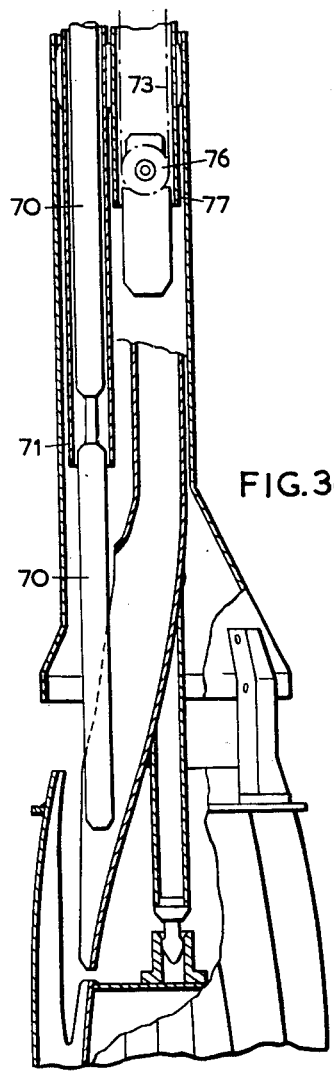

The lower plate 29 carries a locating pin 34 which engages a hole 35 in the core 12, thus ensuring that the assembly is always aligned with the appropriate group of channels. A further pin 90 engages with a radial slot 91 in the core which permits any vertical and radial differential movements of the core to take place whilst rotation of the guide tube assembly and standpipe extension tube 21 is prevented. A vertical tube 36 (see FIG. 2) allows for passage of a control rod.

From the foregoing it will be clear that any of the channels in the core 12 which lie under the guide tube assembly may be serviced simply by rotating the charge chute 15 to the appropriate angular position. Thus, for refuelling it is only necessary to remove the relatively small cover plate 37 from the removable slab 38 in the pile cap 39 whereupon a fuelling machine (incorporating means for withdrawing and storing the charge chute seal plugs 19 and 20) may be positioned over the hole and refuelling carried out.

Attached to the outside of each guide tube 27 is a small bore pipe 40 leading from a sampling annulus 41 to the header plate of a removable selector valve 42 mounted within the standpipe extension tube 21. Group sampling and single sampling pipes 43 lead from the selector valve to a position outside the reactor. The selector valve is actuated by pressure gas which is fed through a supply pipe 44 which extends upwards through a selector valve support tube 45 and out through the sealing plug 16, the supply of actuating gas being controlled by a solenoid 46. The selector valve normally remains stationary but can at will be turned to any position to obtain the required individual sampling. The selector valve may alternatively be operated by a rotary electro-magnetic actuator.

If desired thermo-couples may be incorporated in the selector valve so as to allow continuous group temperature indication and also the ability to measure the temperature in each channel by rotating the selector valve. A filter may also be included in the selector valve.

FIGS. 2a, 2b, 2c and 6 show a charge chute assembly similar to that shown in FIGS. 1a etc. but which in this case incorporates control rod mechanism designed as a unit and which is normally integral with the shield plug 16 but which may be withdrawn therefrom for maintenance purpose.

Referring now to these figures, the control rod 50 moves in a guide tube 51 and is suspended through an overwind shock absorber 52 on a duplex chain 53. This chain passes upwards around a drive sprocket 54, then downwards through a guide tube 55 and around a pulley 56 carried by a chain tension weight 57, to be finally anchored at 58 to the shield plug 59. The drive motor and gear box for the control rod is generally indicated at 60 and incorporates emergency hand wound mechanism. The control rod is shown in the retracted position where it is held by a latch 61 controlled by a spindle 62 which is accessible from the top of the assembly. An emergency drop shock absorber 63 is also provided.

FIGS. 3a, 3b, 3c and 6 show a charge chute assembly, again similar to that of FIGS. 1a, etc. but which in this case incorporates trailing-lead thermo-couple fuel elements.

Referring now to these figures, five trailing-lead thermo-couple fuel elements 70 are housed in a guide tube 71 and during the loading operation the string of elements is supported by the thermo-couple leads 72 (which incorporate weak links), each element being individually supported by its own lead at a point just above the top element. From here upwards the leads are attached to a duplex chain 73 which is capable of carrying the full weight of the string of elements.

This string is loaded in the remote handling facility into the standpipe plug by engaging the chain on a sprocket 74 which is driven via a worm and wheel, not shown, from a shaft 75 extending through the seal plug. This shaft may be driven by a hand winding gear or by a geared motor. The standpipe plug thus loaded is inserted into the appropriate standpipe by the servicing machine. The fuelling machine then prepares the channel by inserting one or two new fuel elements and is removed to allow access to the shaft 75 which is used to lower the string into the channel.

To remove the elements 70 from the channel, the fuelling machine lowers a weight on to the uppermost element in the string. The grab is not removed. The shaft 75 is then turned so as to wind up the leads which break at their weak links one after the other until all the leads have been withdrawn into the standpipe plug. The fuelling machine then removes the weight and discharges the channel in the normal manner. The old broken leads and chain are removed from the plug in the remote handling facility prior to fitting another string of elements.

The chain 73 is arranged within the standpipe plug in a loop held by a weighted sprocket 76 movable in a guide tube 77 in a similar manner to the control rod winding gear and it is therefore possible to provide an unbroken thermo-couple lead from the junction on the element to the plug forming the pressure seal at the top of the assembly and to which the leads on the pile cap are plugged.

Figure 4:
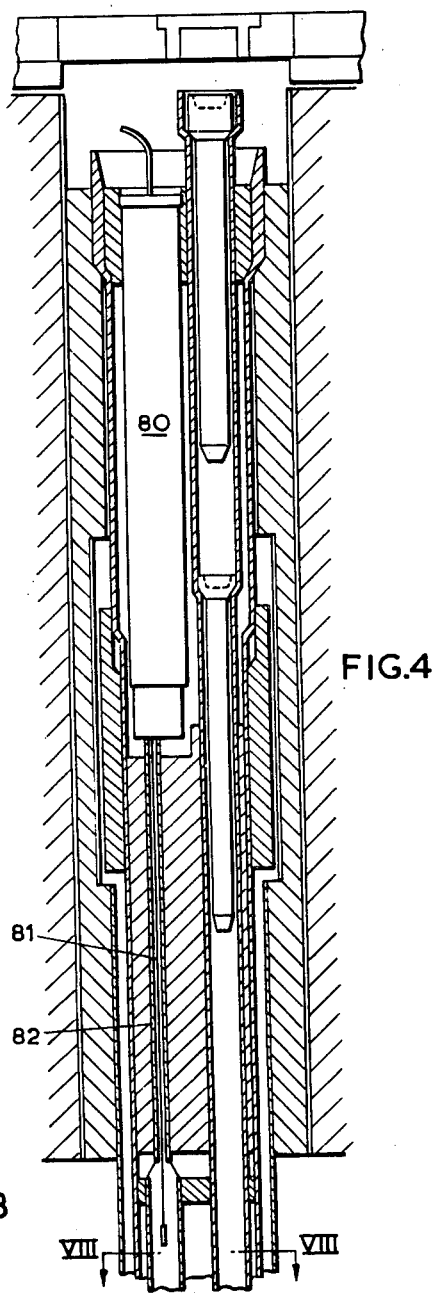
FIG. 4 is a sectional elevation of the upper part of the apparatus in a further form.
Figure 8:
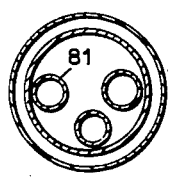
FIG. 8 is a sectional plan on the line 8—8 of FIG. 4.

FIG. 4 shows the upper end of a charge chute assembly basically the same as that shown in FIG. 1 but incorporating, in addition, a flux scanning head 80 containing a winding drum, drive motor, emergency hand drive, and ion chamber. The flux scanning wire 82 passes downwardly from the head through a guide tube 81.

A service machine is used to service the components within the standpipe assemblies.

What I claim as my invention and desire to secure by Letters Patent is:

1. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising bearing means in said access duct, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, and an assembly of fixed guide tubes over said reactor core, the end of each guide tube nearer the reactor core being aligned with a fuel channel and the other ends of the guide tubes being positioned to cooperate successively with said opening on rotation of the charge chute.

2. Apparatus according to claim 1, wherein said other ends of the guide tubes define a common pitch circle co-axial with the said axis of rotation.

3. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising bearing means in said access duct, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, an assembly of fixed guide tubes loosely supported from the access duct, a locating pin on the guide tube assembly, and a radial slot in the reactor core engaged by said pin so as to locate the guide tube assembly transversely in relation to the core, the end of each guide tube nearer the core being aligned with a fuel channel and the other ends of the guide tubes being positioned to cooperate successively with said opening on rotation of the charge chute.

4. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising a removable shield plug in said access duct, bearing means in the shield plug, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, and an assembly of fixed guide tubes over said reactor core, the end of each guide tube nearer the reactor core being aligned with a fuel channel and the other ends of the guide tubes being positioned to co-operate successively with said opening on rotation of the charge chute.

5. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising bearing means in said access duct, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, an assembly of fixed guide tubes over said reactor core, the end of each guide tube nearer the reactor core being aligned with a fuel channel and the other ends of the guide tubes being positioned to co-operate successively with said opening on rotation of the charge chute, a selector valve in said access duct, a plurality of gas sampling pipes each connected at one end to one side of said selector valve and at the other end each to a separate said guide tube, and a gas outlet pipe connected to the other side of said valve for drawing gas samples away from the apparatus.

6. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising bearing means in said access duct, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, an assembly of fixed guide tubes over said reactor core, the end of each guide tube nearer the reactor core being aligned with a fuel channel and the other ends of the guide tubes being positioned to cooperate successively with said opening on rotation of the charge chute, a reactivity control member in said core, an electric motor disposed within said access duct and having its axis parallel with the central axis thereof, right-angled gearing driven by said motor, and hoisting means in the access duct and driven by said gearing, for varying the position of the reactivity control member relative to said core.

7. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising bearing means in said access duct, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, an assembly of fixed guide tubes over said reactor core, the end of each guide tube nearer the reactor core being aligned with a fuel channel and the other ends of the guide tubes being positioned to co-operate successively with said opening on rotation of the charge chute, a string of fuel elements in a said fuel channel, said elements having thermocouples and trailing electric leads passing along said string from the thermocouples, and hoisting means in said access duct for loading said string of fuel elements into the core and for unloading it therefrom.

8. In a nuclear reactor including a pressure vessel, a reactor core within the pressure vessel and containing fuel channels having their axes parallel to one another, and means defining a substantially cylindrical access duct through the pressure vessel between the outside and inside thereof and having its central axis parallel with the extended axes of the fuel channels; a charging apparatus in the pressure vessel comprising bearing means in said access duct, said bearing means being displaced radially from the central axis of the access duct, a rigid charge chute mounted in said bearing means to rotate about an axis of rotation displaced radially from said central axis, means defining an opening at the end of the charge chute nearer the reactor core at a fixed radius from the said axis of rotation, an assembly of fixed guide tubes over said reactor core, the end of each guide tube nearer the reactor core being aligned with a fuel channel and the other ends of the guide tubes being positioned to co-operate successively with said opening on rotation of the charge chute, a flux scanning head in the access duct, a flux scanning wire in the access duct and projecting from the said scanning head, means for lowering the said wire down said access duct into the reactor core and means for withdrawing it therefrom.

References Cited by the Examiner

UNITED STATES PATENTS

| | | | |
|---|---|---|---|
| 2,782,158 | 2/57 | Wheeler | 176—59 |
| 2,984,612 | 5/61 | Hackney | 176—30 |
| 3,025,226 | 3/62 | Martin et al. | 176—32 |
| 3,033,774 | 5/62 | Crever | 176—25 |
| 3,044,947 | 7/62 | Payne | 214—21 |
| 3,051,642 | 8/62 | Dent | 176—30 |

FOREIGN PATENTS

| | | |
|---|---|---|
| 844,764 | 8/60 | Great Britain. |
| 844,765 | 8/60 | Great Britain. |

OTHER REFERENCES

"Directory of Nuclear Reactors," vol. II (International Atomic Energy Agency), page 282.

CARL D. QUARFORTH, *Primary Examiner.*

REUBEN EPSTEIN, *Examiner.*